United States Patent
Milvich et al.

(10) Patent No.: US 7,608,813 B1
(45) Date of Patent: Oct. 27, 2009

(54) SCALE TRACK CONFIGURATION FOR ABSOLUTE OPTICAL ENCODER INCLUDING A DETECTOR ELECTRONICS WITH PLURALITY OF TRACK DETECTOR PORTIONS

(75) Inventors: Michelle M. Milvich, Seattle, WA (US); Joseph D. Tobiason, Woodinville, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 0 days.

(21) Appl. No.: 12/273,400

(22) Filed: Nov. 18, 2008

(51) Int. Cl.
*G01D 5/34* (2006.01)

(52) U.S. Cl. .............................. 250/231.13; 250/231.18

(58) Field of Classification Search ............ 250/231.13, 250/231.16, 231.18, 221; 341/11, 13
See application file for complete search history.

(56) References Cited

U.S. PATENT DOCUMENTS

| | | | |
|---|---|---|---|
| 3,882,482 A | 5/1975 | Green | |
| 4,109,389 A | 8/1978 | Balcom | |
| 4,414,754 A | 11/1983 | Lapeyre | |
| 4,631,519 A | 12/1986 | Johnston | |
| 4,859,845 A | 8/1989 | Sakano | |
| 4,928,008 A | 5/1990 | Huggins | |
| 4,964,727 A | 10/1990 | Huggins | |
| 5,010,655 A | 4/1991 | Rieder | |
| 5,017,771 A | 5/1991 | Bartholomew | |
| 5,104,225 A | 4/1992 | Masreliez | |
| 5,129,725 A * | 7/1992 | Ishizuka et al. | ............. 356/617 |
| 5,218,199 A | 6/1993 | Miller | |
| 5,237,391 A | 8/1993 | Huggins | |
| 5,279,044 A | 1/1994 | Bremer | |
| 5,442,166 A | 8/1995 | Hollmann | |
| 5,576,830 A | 11/1996 | O'Brien | |
| 5,773,820 A | 6/1998 | Osajda | |
| 5,886,519 A | 3/1999 | Masreliez | |
| 5,965,879 A | 10/1999 | Leviton | |
| 6,232,594 B1 | 5/2001 | Eccher | |
| 6,271,661 B2 | 8/2001 | Andermo | |
| 6,664,535 B1 | 12/2003 | Nahum | |
| 6,781,694 B2 | 8/2004 | Nahum | |
| 6,867,412 B2 | 3/2005 | Patzwald | |
| 6,888,126 B2 | 5/2005 | Blasing | |

(Continued)

OTHER PUBLICATIONS

Dolan, R.P. (ed.), "Hewlett-Packard Journal," Hewlett-Packard Company, Palo Alto, Calif., Sep. 1980, vol. 31, No. 9, <http://www.hparchive.com>, 32 pages.

*Primary Examiner*—Que T Le
(74) *Attorney, Agent, or Firm*—Christensen O'Connor Johnson Kindness PLLC

(57) ABSTRACT

An encoder configuration comprises an illumination portion, absolute scale pattern comprising absolute tracks, and a detector having a width dimension YDETABS. An absolute track pattern comprises geometrically congruent sub tracks, and the congruent sub tracks are arranged such that if one is translated by the width dimension YDETABS, then they will nominally coincide. The congruent sub tracks may be separated by a dimension YCENT that is less than YDETABS, and may each have a dimension YTOL, such that [YCENT+2(YTOL)] is greater than YDETABS. Thus, the detector may be narrower than the absolute track pattern, but because the detector edges are each nominally located over congruent sub tracks the detected signal is not sensitive to lateral misalignment of the detector within the pattern. These principles provide great freedom in configuring advantageous individual pattern features in the absolute track, even though the detector is narrower than the absolute track.

28 Claims, 7 Drawing Sheets

U.S. PATENT DOCUMENTS 7,186,969 B2 3/2007 Shimomura
7,295,324 B2 11/2007 Jones
7,307,736 B2 12/2007 Tobiason
7,368,705 B2 5/2008 Hare

* cited by examiner

SCALE TRACK CONFIGURATION FOR ABSOLUTE OPTICAL ENCODER INCLUDING A DETECTOR ELECTRONICS WITH PLURALITY OF TRACK DETECTOR PORTIONS

FIELD OF THE INVENTION

The invention relates generally to precision measurement instruments, and more particularly to an absolute optical encoder configuration with multiple scale tracks that may rely on multiple optical sensing principles.

BACKGROUND OF THE INVENTION

Incremental position encoders utilize a scale structure that allows the displacement of a readhead relative to a scale to be determined by accumulating incremental units of displacement, starting from an initial point along the scale. Such encoders are suitable for certain applications, particularly those where line power is available. However, in certain applications, such as those where encoders are used in low power consumption devices, it is more desirable to use absolute position encoders. Absolute position encoders provide a unique output signal, or combination of signals, at each position along a scale. They do not require continuous accumulation of incremental displacements in order to identify a position. Thus, absolute position encoders allow various power conservation schemes. A variety of absolute position encoders are known, using various capacitive, inductive or optical sensing technologies.

One of the most important figures of merit for an absolute encoder is (range/resolution), that is, the maximum allowed absolute measuring range for a device in comparison to its meaningful measurement resolution and/or accuracy. This may be referred to as its "range-to-resolution ratio."

Some encoders achieve a high range-to-resolution ratio by using a number of binary code tracks that run in parallel along a scale. The range of this technique is generally limited by the width of the scale, which determines the number of binary tracks that may be fabricated. Furthermore, crude binary sensing generally limits the resolution. This technique is generally not optimum for narrow scales, which are desirable in a compact encoder. It will be appreciated that the least significant bit (LSB) binary code track may be thought of as a "fine wavelength" incremental track, since it repeats at the "fine" spatial resolution of the LSB and provides only incremental displacement information (that is, it provides only periodic non-absolute signal) unless it is used in combination with tracks that provide more significant code bits. This is characteristic of the fine wavelength tracks that are used in most high-resolution absolute encoders (e.g., those that provide resolution on the order of microns). Thus, the fine wavelength track (fine track) may also be referred to as an incremental track in many absolute encoders.

In comparison to an "all binary" technique, some encoders enhance the resolution of the fine track by using techniques that provide an analog signal related to that wavelength, and then measuring that analog signal to within some fraction of its range, to provide resolution that is finer than the fine wavelength, and thereby extend the range-to-resolution ratio of an absolute encoder. This is typically referred to as signal interpolation, and the ratio of the fine wavelength to the resulting measurement resolution is typically referred to as the interpolation ratio. Depending on the technology used, and the level of expenditure used to provide the precision components and assembly that govern the signal-to-noise (S/N) ratio, practical signal interpolation ratios of up to 100, 300, or even 1000 or more are possible. However, generally speaking, an interpolation ratio greater than approximately 100 may require significant additional expense for the required precision components and assembly. Furthermore, if a sub-micron resolution is required, then the wavelength of the fine track may be on the order of 40 microns or less. Five additional binary tracks would only bring the associated range up to about 1.3 millimeters, which is of limited utility. Thus, this technique is generally not optimum for narrow scales in combination with high resolution (e.g., on the order of microns).

To overcome this limitation, some encoders abandon binary tracks and use signal interpolation on additional scale tracks. Such tracks may be referred to as absolute scale tracks (absolute tracks). It will be appreciated that such signal interpolation must have resolution and repeatability within plus and minus one half of the fine wavelength, in order to resolve the ambiguity of the periodic signals provided by the fine track. Some encoders use an absolute track that varies monotonically (e.g., linearly) over the entire measurement range. However, assuming a fine track wavelength on the order of 40 microns or less, and an interpolation ratio on the order of 100, or even more, such an absolute track alone would bring the associated absolute measuring range up to only 2-10 millimeters, which is of limited utility.

To overcome this limitation, some encoders use at least two additional absolute tracks that have significantly longer spatial wavelengths than the fine track. Their wavelengths may be conveniently referred to as absolute wavelengths and/or medium wavelengths and/or coarse wavelengths, in order to distinguish them from the fine wavelength and/or emphasize their function. As one example, using known sensing techniques (e.g., optical sensing techniques), periodic analog signals (e.g., sinusoidal signals or similar processed outputs, or the like) are derived from two absolute tracks that have slightly different medium wavelengths. According to known relationships, the spatial phase difference between the two analog signals changes by 360 degrees over a distance that is proportional to the product of the medium wavelengths and inversely proportional to the absolute value of their difference. This distance may be referred to as a coarse synthetic wavelength, or coarse wavelength, which is approximately the absolute measurement range of the device. The phase difference between the signals from medium tracks provides the absolute position to a coarse resolution. This may be referred to as the coarse position. The coarse position resolution and/or accuracy must be within approximately plus and minus one half of one of the medium wavelengths, in order to resolve the ambiguity of the periodic signal(s) provided by the medium track, in order to reliably identify a particular period of the medium wavelength corresponding to the position. The periodic signal(s) from that medium track may be interpolated to provide the absolute position to a medium resolution that is better than the coarse resolution. This may be referred to as the medium position. The medium position resolution and/or accuracy must be within approximately plus and minus one half of one fine wavelength, in order to resolve the ambiguity of the periodic signal(s) provided by the fine track, in order to reliably identify a particular period of the fine wavelength corresponding to the position. The periodic signal from the fine track may be interpolated to provide the absolute position of device with the ultimate fine resolution and/or accuracy. According to the foregoing description, assuming a fine track wavelength on the order of 40 microns or less, and an interpolation ratio on the order of 100 for both the coarse synthetic wavelength and the medium wavelength, such an absolute track configuration would bring the associated absolute measuring range up to approximately 100 millimeters, which is of utility in a number of applications (e.g., in indicators, linear gauges, rotary encoders, and the like.) The foregoing technique is generally known and additional detail regarding various related encoder configurations and/or signal processing is readily available in various absolute encoder and absolute interferometer patents. The foregoing technique may be referred to as a synthetic coarse wavelength absolute measurement technique (SCWAM technique.)

U.S. Pat. Nos. 3,882,482; 5,965,879; 5,279,044; 5,886, 519; 5,237,391; 5,442,166; 4,964,727; 4,414,754; 4,109,389; 5,773,820; and 5,010,655 (hereinafter "the '655 patent"), disclose various encoder configurations and/or signal processing techniques relevant to absolute encoders, including those outlined above, and are hereby incorporated herein by reference in their entirety. However, the prior art fails to teach configurations which provide certain combinations of range-to-resolution ratio, high resolution, compact size, robustness, and cost desired by users of absolute encoders. Improved configurations of absolute encoders that provide such combinations would be desirable.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention is directed to improved absolute encoder configurations that provide improved combinations of range-to-resolution ratio, high resolution, compact size, robustness, and fabrication and assembly cost.

Various features of the present invention overcome shortcomings of the prior art. Prior art FIGS. 1A-1C of the present application correspond to FIGS. 2-4 of the previously incorporated '655 patent. As described in the '655 patent, a single absolute control track (e.g., a track that provides a monotonically varying analog output) is utilized in combination with an incremental track for determining position, and FIGS. 1A-1C each illustrate a possible pattern for the single control track. FIG. 1A illustrates a control track with a pattern of bars which extend along the scale and taper from the left-hand end to the right-hand end of the scale such that the transmission of light through the pattern varies in an analog fashion (e.g., linearly) along the track. FIG. 1B illustrates a control track with a pattern of dots which vary in size along the scale, to similar effect. FIG. 1C illustrates a control track with another pattern of bars which have a uniform spacing but which vary in their individual widths as a function of their position along the scale, to similar effect. As previously indicated, such a single analog control track is likely to provide a measuring range on the order of only a couple of millimeters when used in combination with an incremental track having a wavelength of 40 microns. Thus, such a configuration is not suitable for a practical high resolution absolute encoder. The '655 patent suggests that in some cases, to extend the range, the control track patterns may have to be repeated. However, this is merely suggested, not enabled. In particular, according to previous discussion herein, in combination with a fine wavelength of 40 microns the patterns of FIGS. 1A-1C would need to have a length along the measuring axis of approximately two millimeters. This raises significant fabrication, detection and signal processing issues not addressed in the '655 patent.

For example, firstly, to approximate patterns of FIGS. 1A-1C over a two millimeter range apparently requires small feature sizes (on the order of 10 microns) and controlled changes in those sizes on the order of 1% per 20 microns along the scale (e.g., 0.1 microns per 20 microns along the scale.) This is more demanding than the fabrication requirements of a typical incremental scale track, which may dramatically increase scale fabrication costs. Secondly, such feature sizes may give rise to undesirable diffraction effects, which introduces signal noise and lowers the S/N ratio, which lowers the reliable interpolation ratio, particularly near the ends of each repeated pattern (where an abrupt feature width or density transition takes place). Thirdly, such small feature sizes may be sensitive to blurring variations if the gap to the detector and light source is not carefully controlled. A certain amount of blurring may be desirable. Too much blurring will degrade the S/N ratio, and too little blurring may introduce unwanted spatial frequencies into the detected signal. None of these considerations are addressed by these or similar absolute track patterns. For these and other reasons, the patterns of FIGS. 1A-1C are not sophisticated enough to provide a good range-to-resolution ratio in combination with high resolution (e.g., on the order of microns, or less).

Another prior art track pattern that can provide an analog type signal suitable for an absolute track is described in *Hewlett Packard Journal*, Vol. 31, No. 9, September 1989. FIG. 2 of the present application corresponds to FIG. 7A of the *HP Journal*. As shown in FIG. 2, a sinusoidal track pattern 200 is bounded by a first pattern boundary TP1 and a second and a second mirror image track boundary TP2, which are disposed on an angle encoder disc. A series of photo diodes IL1-IL4 are illuminated through or around the sinusoidal track pattern 200. The amount of illumination passing through the pattern 200 to each of the photo diodes IL1-IL4, which are evenly spaced over the spatial wavelength of the pattern 200, generates different photo currents that may be compared to enable the absolute determination of position relative to the diode array within one wavelength of the pattern, e.g., according to well-known "quadrature signal" processing methods. A disadvantage of this pattern track is shown in FIG. 2. The area of each of the photo diodes IL1-IL4 outside of the lines 201 and 202 is essentially wasted area. However, in the configuration of FIG. 2 this area must be provided to allow for misalignment due to fabrication and assembly tolerances, etc. In general, it would be preferable to reduce the size of the photo diode IC as much as possible relative to a desired sinusoidal signal amplitude, because the photo diode IC has a very high cost per unit area, and for other reasons. However, if this area is not provided and the end of a photo diode is located within the track pattern 200, the variation of illumination area on the detector will not be a sinusoidal function of position (e.g., the peak of the function may be truncated), so the output signal will not exhibit the desired or expected sinusoidal variation with position, which disrupts meaningful signal interpolation. This and other distortions of the desired sinusoidal output (as a function of position) may be referred to as lost sinusoidal signal fidelity, or lost sinusoidal fidelity, for short.

It should be appreciated that, generally speaking, sinusoidal output signals are used for signal interpolation in encoders due to some desirable signal processing advantages. However, sinusoidal signal fidelity may be lowered by optical noise (e.g., stray light, non-uniform light, or unwanted diffraction effects), electronic noise, inaccurate patterns or alignment or relative motion (e.g., motion or misalignment along the Y axis), and spatial harmonic signal components (e.g., a square wave pattern passing a linear detector produces a trapezoidal illuminated area variation as a function of position, which includes significant spatial harmonic content.) Several advantageous signal interpolation methods (e.g., well-known quadrature signal interpolation methods) assume ideal sinusoidal signals, and loss of sinusoidal fidelity directly affects their interpolation accuracy and the resulting interpolation ratio. Thus, in order to reliably provide an absolute encoder with the best range-to-resolution ratio possible, in as small a size as possible (e.g., by using very few absolute tracks), it is essential to maintain the best possible sinusoidal fidelity under all expected misalignments and operating variations. Among other advantages, the inventive configurations outlined below provide significant improvements in sinusoidal fidelity in comparison to the techniques described in the prior art, particularly with respect to providing robust and accurate operation under various misalignments and operating variations that may be expected in a practical and economical device. The inventive configurations may provide particularly economical and compact devices with an excellent range to resolution ratio.

In various embodiments according to this invention an encoder configuration for use in an absolute position sensing device comprises an illumination portion, a scale element including an absolute scale pattern comprising a fine track pattern and at least a first absolute track pattern, and the detector electronics. The various track patterns are arranged to receive light from the illumination portion and output respective spatially modulated light patterns along respective light paths to various corresponding detector portions of the detector electronics (e.g., a fine track detector portion and at least a first absolute track detector). The fine track pattern and its corresponding detector portion may be configured according to known techniques. In various embodiments an absolute track detector portion may be configured with individual photodetector areas that have a Y direction edge-to-edge dimension YDETABS along a Y direction that is perpendicular to a measuring axis direction, and these photodetector areas may be configured to spatially filter their received spatially modulated light pattern and output a plurality of respective position indicating signals that have respective spatial phases. In accordance with one aspect of this invention, an absolute track pattern comprises geometrically congruent subtrack portions that extend along the measuring axis direction, and the geometrically congruent subtrack portions are arranged such that if one of the geometrically congruent portions is translated along the Y direction by the dimension YDETABS, then the geometrically congruent portions will nominally coincide. The geometrically congruent subtrack portions may furthermore be configured such that they are separated along the Y direction by a dimension YCENT that is less than YDETABS, and the geometrically congruent subtrack portions may each have a Y direction dimension YTOL, such that the dimensional quantity [YCENT+2(YTOL)] is greater than YDETABS. Thus, the detector portion for sensing the absolute track may be narrower than the absolute track pattern along the Y direction, but because the ends of the photo detectors are each nominally located over geometrically congruent sub track portions (to sense geometrically congruent light patterns), the detected signal is not sensitive to misalignment of the detector portion along the Y direction. It will be appreciated that a narrower detector portion is more economical, and may also facilitate a compact device.

The principles outlined above provide unprecedented freedom in configuring the individual pattern portions of an absolute track, even though the detector is narrower than the absolute track. In various embodiments, an absolute track pattern comprises patterned signal varying portions configured such that an area of the patterned signal varying portions varies corresponding to a periodic function of x having a spatial wavelength, where x designates an x-coordinate location along the measuring axis direction. In various embodiments the periodic function may advantageously be a quasi-sinusoidal function (e.g., a triangular wave function, or a trapezoidal wave function, or the like) or even more advantageously a nominally ideal sinusoidal function.

In various embodiments, a plurality of absolute tracks configured as outlined above may be used in an absolute scale pattern, along with corresponding detector portions, and the resulting signals may be used in combination to provide a desired absolute measuring range. In some such embodiments the absolute scale pattern may have a width less than 3.0 millimeters and still be used to provide an outstanding range-to-resolution ratio in an economical encoder configuration.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 3:
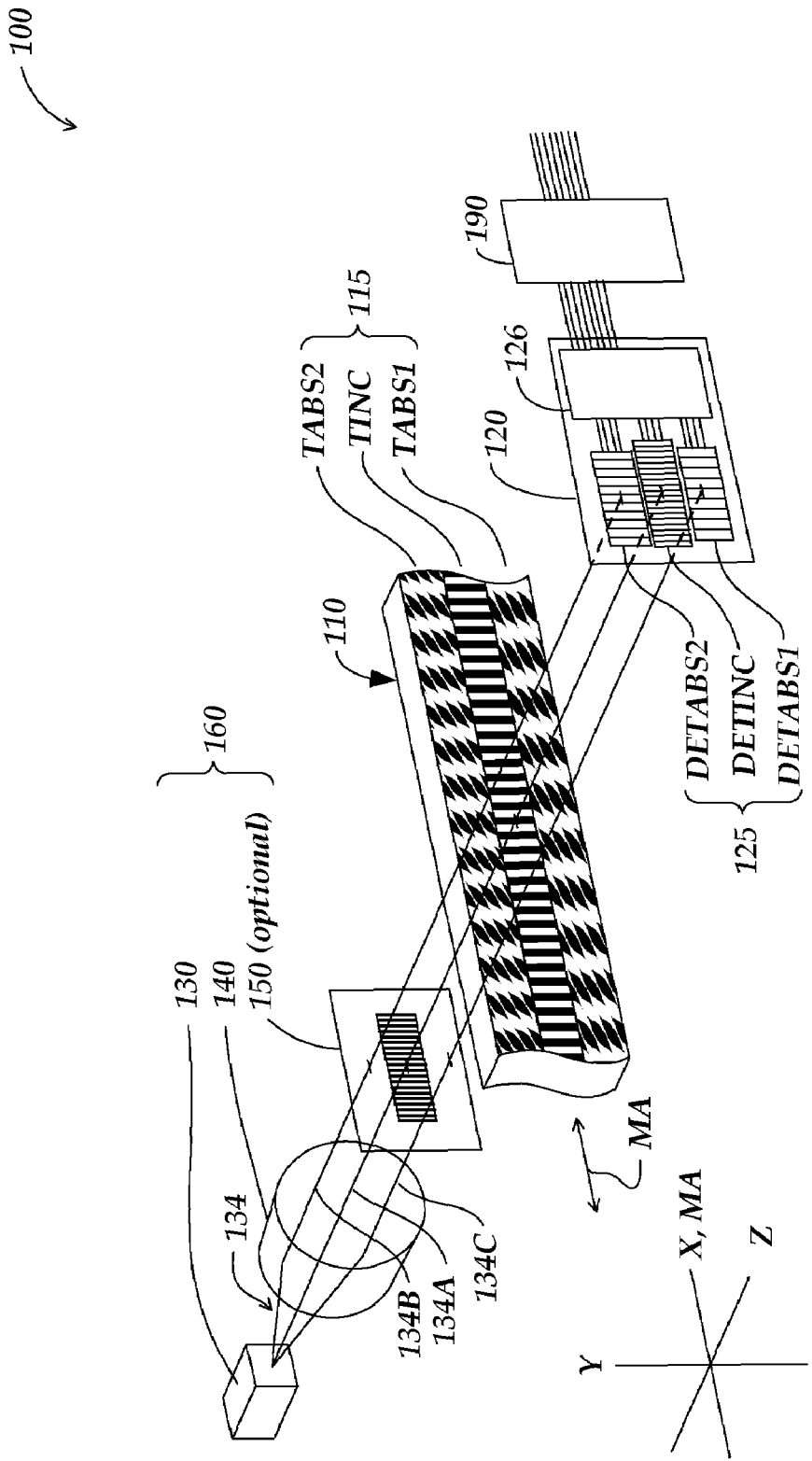
FIG. 3 is an exploded diagram of one embodiment of an absolute optical encoder configuration in accordance with the present invention.

FIG. 3 is an exploded diagram schematically illustrating one embodiment of an absolute optical encoder configuration 100 including various features in accordance with the present invention. As shown in FIG. 3, the encoder configuration 100 includes a scale element 110, detector electronics 120 which is connected to signal generating and processing circuitry 190 by power and signal connections 192, and an illumination system or portion 160 comprising a light source 130 for emitting visible or invisible wavelengths of light, a lens 140, and an optional source grating 150. The light source 130 may also be connected to the signal generating and processing circuitry 190 by power and signal connections (not shown). The scale element 110 includes an absolute scale pattern 115 including three scale track patterns: an incremental track pattern TINC, a first absolute track pattern TABS1, and a second absolute track pattern TABS2, described in more detail below with reference to FIG. 4. The track patterns TABS1 and TABS2 are referred to as absolute scale track patterns because they provide signals (e.g., a combination of signals) usable to determine an absolute position over an absolute measuring range determined by their configuration. FIG. 3 also shows orthogonal X, Y and Z directions, according to a convention used herein. The X and Y directions are parallel to the plane of the absolute scale pattern 115, with the X direction parallel to the intended measuring axis direction MA (e.g., perpendicular to elongated grating pattern elements that may be including in the incremental track pattern TINC.) The Z direction is normal to the plane of the absolute scale pattern 115.

The detector electronics 120 includes a detector configuration 125 comprising three detector tracks DETINC, DET1 and DET2 arranged to receive light from the three scale track patterns TINC, TABS1 and TABS2, respectively. The detector electronics 120 may also include signal processing circuitry 126 (e.g., signal offset and/or gain adjustments, signal amplifying and combining circuits, etc.) In one embodiment, the detector electronics 120 may be fabricated as a single CMOS IC.

In operation, light 134 emitted from the light source 130 may be partially or fully collimated by the lens 140, over a beam area sufficient to illuminate the three scale track patterns. FIG. 3 schematically shows three light paths 134A, 1324B and 134C, of the light 134. Light path 134A is a representative central path including light that illuminates the scale track pattern TINC. When the scale track pattern TINC is illuminated, it outputs a spatially modulated light pattern (e.g., interference fringe light from diffracted orders, in some embodiments) to the detector track DETINC of the detector electronics 120. Light paths 134B and 134C are representative paths including light that illuminates the scale track patterns TABS2 and TABS1, respectively. When the scale track patterns TABS2 and TABS1 are illuminated, they output spatially modulated light patterns (e.g., patterned light corresponding to their patterns) to the detector tracks DETABS2 and DETABS1, respectively, of the detector electronics 120. In various embodiments, the encoder configuration 100 may be configured such the track patterns TABS2 and TABS1 produce a shadow image (e.g., a blurred or unblurred shadow image) projected onto the detector tracks DETABS2 and DETABS1, respectively, as described in greater detail below with reference to FIGS. 4-7. It will be appreciated that all spatially modulated light patterns move in tandem with the scale 110. In each of the detector tracks DETINC, DET1 and DET2 individual photodetector areas are arranged to spatially filter their respective received spatially modulated light pattern to provide desirable position indicating signals (e.g., quadrature signals, or other periodic signals having a spatial phase relationship that is conducive to signal interpolation.) One embodiment of the detector tracks DETINC, DET1 and DET2 is described in greater detail below with reference to FIG. 4. In some embodiments, rather than individual photodetector areas, a spatial filter mask with individual apertures may mask relatively larger photodetectors to provide light receiving areas analogous to the individual photodetector areas illustrated, to provide a similar overall signal effect according to known techniques.

In some moderate resolution embodiments (e.g., with fine track wavelengths on the order of 40 microns, or more), the encoder configuration 100 may be configured such that the track pattern TINC produces a shadow image projected onto the detector track DETINC. In relatively higher resolution embodiments, the track pattern TINC is generally configured to produce diffracted light. In some embodiments, for example those having a fine track wavelength of approximately 8 microns or less, the encoder configuration 100 may be configured according to known methods such that diffracted orders (e.g., +/1 first orders) produce interference fringes that reach the detector track DETINC, according to known methods. In such embodiments, the source grating 150 is generally omitted. In other embodiments, for example those having a fine track wavelength of approximately 8-40 microns, the encoder configuration 100 may be configured according to known methods such that several diffracted orders interact to produce a self image (e.g., a Talbot image or a Fresnel image) at the plane of the detector track DETINC. In self-imaging configurations the light source 130 may be an LED, in which case the source grating 150 is generally not optional. In such a case, the light surrounding the representative light path 134A passes through the grating structure of the source grating 150 to provide an array of partially coherent illumination sources at the grating openings, which are arranged with a pitch approximately matching the pitch or wavelength of the track pattern TINC, to illuminate the scale track pattern TINC according to known self-imaging illumination principles. FIG. 3 shows an embodiment of the source grating 150 that allows the representative light paths 134B and 134C to pass through a transparent substrate of the source grating 150, so that their intensity and degree of collimation, which contributes to the quality of the signals from the detector tracks DETABS1 and DETABS2, is not disrupted by the grating structure of the source grating 150. In other embodiments, the representative light paths 134B and 134C may also pass through a grating structure on the source grating 150, however, this is not the optimum configuration.

As is known in the art, each of the respective fine track techniques outlined above generally imposes respective constraints on the spacing between the illumination system 160, the scale track pattern TINC, and the detector track DETINC. In various embodiments, the scale element 110 is positioned at a generally stable distance from the illumination system 160, and from the detector electronics 120 within an encoder housing or gauge housing or a readhead assembly (not shown), according to known techniques. One advantage of an absolute track pattern according to this invention is that the spatial harmonic content in the resulting detector signal does not vary substantially at various spacings between the illumination system 160, the absolute scale pattern 115, and the detector configuration 125, and thus a single absolute track pattern design can accommodate a variety of fine track techniques and adjustments without imposing additional design constraints. Thus, in some embodiments, this allows a single illumination system 160, and/or a single light source 130, and/or a single lens 140, and/or a single detector electronics IC including each of the detector tracks (DETINC, DETABS1 and DETABS2), to be used for all three tracks, even though the technique used to form the spatially modulated light from the track pattern TINC (e.g., interference or self-imaging), is different than the technique used to form the spatially modulated light from the track patterns TABS1 and TABS2 (e.g., shadow projection). Various embodiments of absolute track patterns (e.g., TABS1 TABS2) and their associated detector tracks (e.g., DETABS1, DETABS2) are described in greater detail below.

In various applications, the detector electronics 120 and illumination system 160 are mounted in a fixed relationship relative to one another, e.g., in a readhead or gauge housing (not shown), and are guided along the measuring axis relative to the scale 110 by a bearing system, according to known techniques. The scale may be attached to a moving stage, or a gauge spindle, or the like, in various applications. The configuration shown in FIG. 3 is a transmissive configuration. The scale pattern 115 comprises light blocking portions and light transmitting portions (e.g., fabricated on a transparent substrate using known thin-film patterning techniques, or the like) that output the spatially modulated light patterns to the detector tracks by transmission. It will be appreciated that similar components may be arranged in reflective embodiments, wherein the illumination system 160 and the detector electronics are arranged on the same side of the scale 110, and positioned for angled illumination and reflection if necessary, according to known techniques. In reflective embodiments, the scale pattern may comprise high reflectance portions that output the spatially modulated light pattern to the detector tracks by reflection, and low reflectance portions (or portions that direct light away from the detector tracks), which may be fabricated according to known techniques. In either transmissive or reflective scale patterns, the portions of the scale pattern that provide the light that is detected by the absolute detector tracks (e.g., DETABS1 or DETAB2), may be referred to as the signal producing portions of the scale pattern, and it will understood that other portions of the scale pattern generally provide as little light as possible to the detector tracks and may be referred to as signal diminishing portions. It should be appreciated that the signal producing portions or the signal diminishing portions of the scale pattern may be patterned according to the teachings herein, in various embodiments. Stated another way, scale patterns which are "negatives" of each other may both produce useable signals, with the resulting signal variations also being approximately the "negative" of each other for a given reflective or transmissive arrangement. Thus, the scale patterns outlined below are described in terms of "signal varying portions", and it will be understood that in various embodiments, the signal varying portions may comprising either the signal producing portions or the signal diminishing portions of the scale pattern.

It will be appreciated that the sequence of the scale tracks along the Y axis direction in FIG. 3 is exemplary only, and not limiting. For example, in other embodiments, the absolute track patterns TABS1 and TABS2 may arranged adjacent to one another with the fine track pattern TINC located to one side of them, provided that the detector tracks (and the source grating 150, if included) are arranged along the proper corresponding light paths according to the teachings outlined above.

Figure 4:
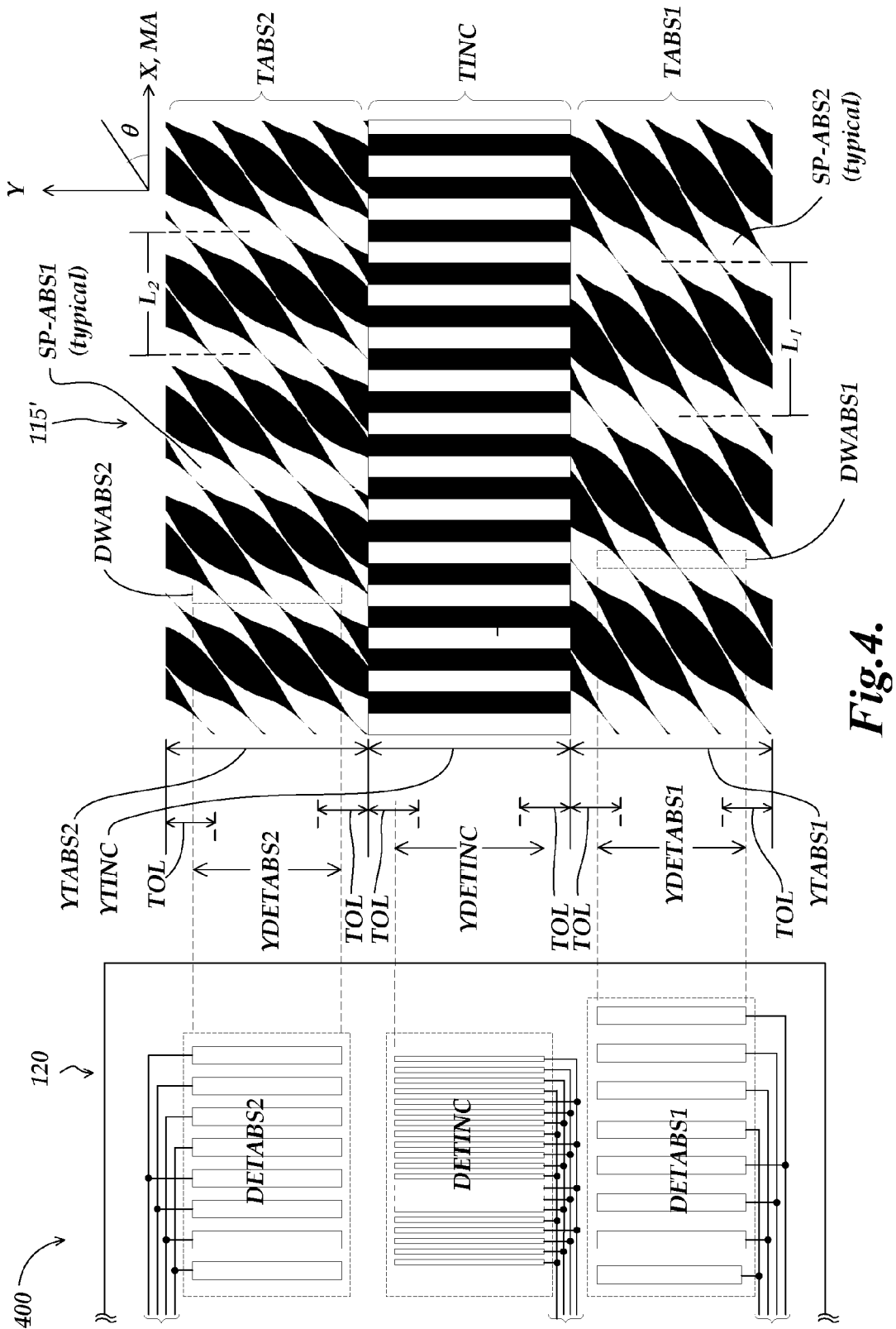
FIG. 4 is a diagram of various geometric relationships in a detector and absolute scale pattern configuration usable in the absolute optical encoder configuration of FIG. 3.

FIG. 4 is a diagram 400 of various geometric or alignment relationships in one embodiment of a detector and absolute scale pattern configuration that are usable in the absolute optical position encoder configuration 100 of FIG. 3. As shown in FIG. 4, a representative segment of an absolute scale pattern 115', which is suitable for use with the known SCWAM technique outlined previously, includes a fine track pattern TINC, a first absolute or medium scale track pattern TABS1, and a second absolute or medium scale track pattern TABS2. Briefly, the medium track patterns TABS1 and TABS2 include signal varying portions SP which transmit (or reflect) a light pattern that is spatially modulated in a pattern approximately corresponding to their geometry. Each signal varying portion SP is shaped based on a Y direction "cross section" dimension that varies as a sinusoidal function of "x", that is, as a function of position along the X direction and/or measuring axis MA of the scale pattern 115', as described in greater detail below with reference to FIGS. 5 and 6.

Figure 1A:
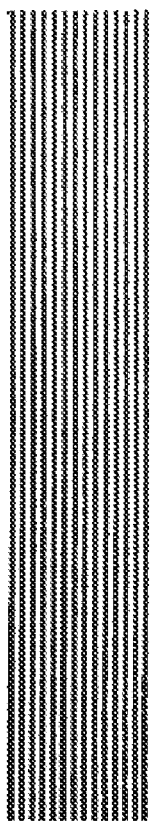
FIGS. 1A-1C are diagrams of prior art control track scale patterns used to provide an absolute scale track.
Figure 1B:
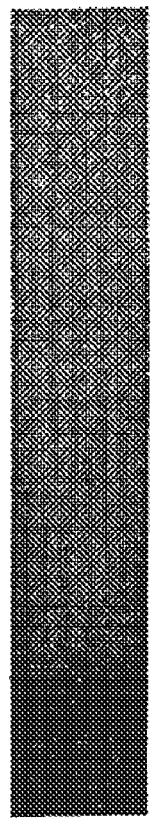
Figure 1C:
Figure 2:
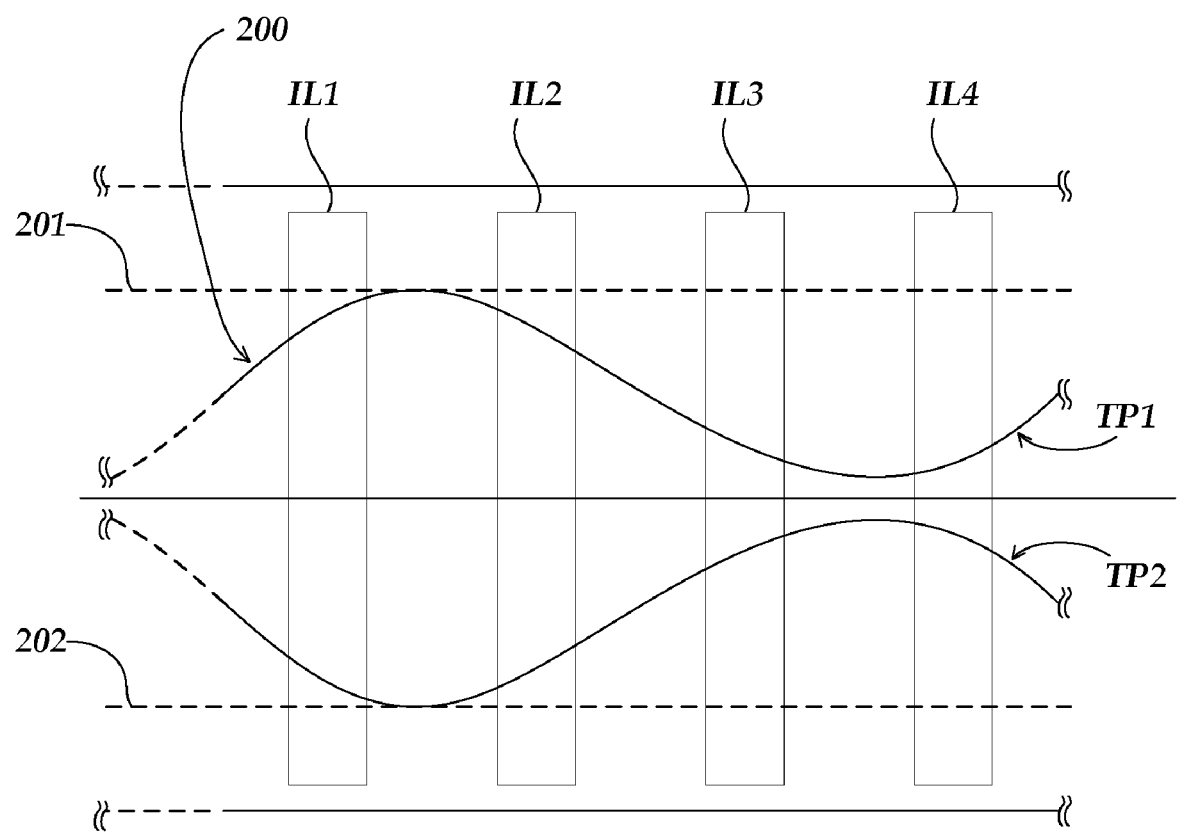
FIG. 2 is a diagram of a prior art scale pattern and detector configuration that provides sinusoidal detector signals as a function of position.

The spatially modulated light pattern of each track pattern TINC, TABS1 and TAB2 is nominally aligned to be centered over the corresponding detector track DETINC, DETABS1 and DETABS2, respectively (e.g., based on an overall encoder configuration such as that described with reference to FIG. 3). According to one aspect of the invention, the detectors of the absolute detector tracks DETABS1 and DETABS2 are configured to sense spatially modulated light over respective Y direction detector edge-to-edge dimensions YDETABS1 and YDETABS2, respectively, which are less than the corresponding Y direction scale track pattern dimensions YTABS1 and YTABS2. This allows for misalignment tolerance zones or sub-tracks TOL, which extend along the measuring axis MA on each side of a center or nominal alignment center sub-track, as described in greater detail below with reference to FIG. 5. For reference, and for purposes of explanation, FIG. 4 schematically illustrates representative detector window areas DWABS1 and DWABS2, which are shown aligned with the center sub track of absolute track patterns TABS1 and TABS2, respectively. Detector window areas DWABS1 and DWABS2 correspond to the detection areas of individual detector elements of the detector tracks DETABS1 and DETABS2, respectively, and are illustrated in a position corresponding to a nominal operational alignment. It should be appreciated that the detector and absolute scale pattern configuration diagrammed in FIG. 4 overcomes the problem of wasted detector area that was previously described with reference to prior art FIG. 2.

In the embodiment shown in FIG. 4, each of the detector tracks DETINC, DETABS1 and DETABS2 comprises an array of individual detector elements arranged in a known quadrature-type detector layout. Briefly, in each array four adjacent detector elements are evenly spaced to provide spatial filtering that detects four spatial phases (i.e., 0, 90, 180, 270 degrees) of the spatially modulated light pattern that they receive. A plurality of groups of four such adjacent detector elements may be provided, and the detectors that detect the same spatial phase may be interconnected to sum their signal contributions, as illustrated in FIG. 4. Thus, sinusoidal quadrature signals are provided as a function of position, as each spatially modulated light pattern moves over its corresponding detector track. The quadrature signals may be processed to determine the spatial phase position of each track within a local wavelength, according to known techniques. These determined spatial phase positions may be processed according to the known SCWAM technique, outlined previously, in order to determine an absolute position.

In some embodiments, the overall width of the scale pattern 115' may be approximately 3.0 millimeters or less, the dimensions YTINC, YTABS1 and YTABS2 may each be approximately 1.0 millimeter or less, and the dimensions YDETINC, YDETABS1 and YDETABS2 may each be less than the corresponding dimensions YTINC, YTABS1 and YTABS2, respectively. In one specific example embodiment, the dimensions YTINC, YTABS1 and YTABS2 may each be 0.8 millimeters, the dimensions YDETINC, YDETABS1 and YDETABS2 may each be 0.508 millimeters, and the various sub tracks TOL may extend by an amount of approximately 0.146 millimeters along the Y direction beyond the dimensions YDETINC, YDETABS1 and YDETABS2, to allow for both misalignment and to prevent blurred spatially modulated light from bleeding onto the detectors of an adjacent track. The wavelength L2 of absolute track pattern TABS2 may be L2=720 microns and wavelength L1 of absolute track pattern TABS1 may be L1=700 microns. The wavelength of the fine track pattern TINC may be 20 microns. Using the SCWAM technique, this provides an absolute range of approximately 25.2 mm, and allows reasonable interpolation ratios to be used. It should be appreciated that in this example embodiment, a total Y direction dimension of the scale pattern 115' is approximately 2.4 millimeters, and the total Y direction dimension that spans all of the detector tracks included on the detector electronics 120 is approximately 2.1 millimeters. Such compact dimensions are particularly advantageous in a number of applications (e.g., linear gauges and the like), both in relation to size and in relation to cost. Of course the configuration and dimensions outlined in the example above, are exemplary only, and not limiting. For example, various Y direction dimensions may be increased to provide larger signals and/or wider tolerance sub tracks, and/or additional space to prevent blurred light from bleeding from one track to another, or additional absolute tracks may be provided to increase the absolute measuring range (e.g., using the SCWAM technique with additional absolute tracks having longer wavelengths). Furthermore, in the embodiment shown in FIG. 4, the Y direction edge-to-edge dimension of each detector element is the same as the overall Y direction dimension of its corresponding detector track because the ends of each detector element are perpendicular to the Y direction, and the detector elements ends are aligned to one another along the X direction. However, it should be appreciated that more generally, in some embodiments, an absolute track pattern may work cooperatively with a detector element that has parallel ends that are not perpendicular to the Y direction (e.g., "slanted" ends), in which case such a detector element may still have a constant Y direction edge-to-edge dimension (e.g., YDETABS1) at each point along the X direction. In such embodiments, due to the "parallelogram" shape resulting from the slanted parallel ends, the overall Y direction dimension of the detector element will be greater than its Y direction edge-to-edge dimension, as will the overall Y direction dimension of its corresponding detector track. In addition, it is not a strict requirement that the detector elements within a given detector track be perfectly aligned to one another along the X direction. In principle, their placement may meander a bit along the Y direction, relative to one another, further increasing the overall Y direction detector track dimension. Such embodiments may require a relatively wider absolute track pattern (or, conversely, a relatively reduced Y direction edge-to-edge dimension for the detector elements) in order to provide a track pattern that is compatible with the overall track dimension and a given misalignment tolerance. Nevertheless, various other benefits outlined above and described below will still be obtained with a track configuration according to the teachings disclosed herein.

Figure 5:
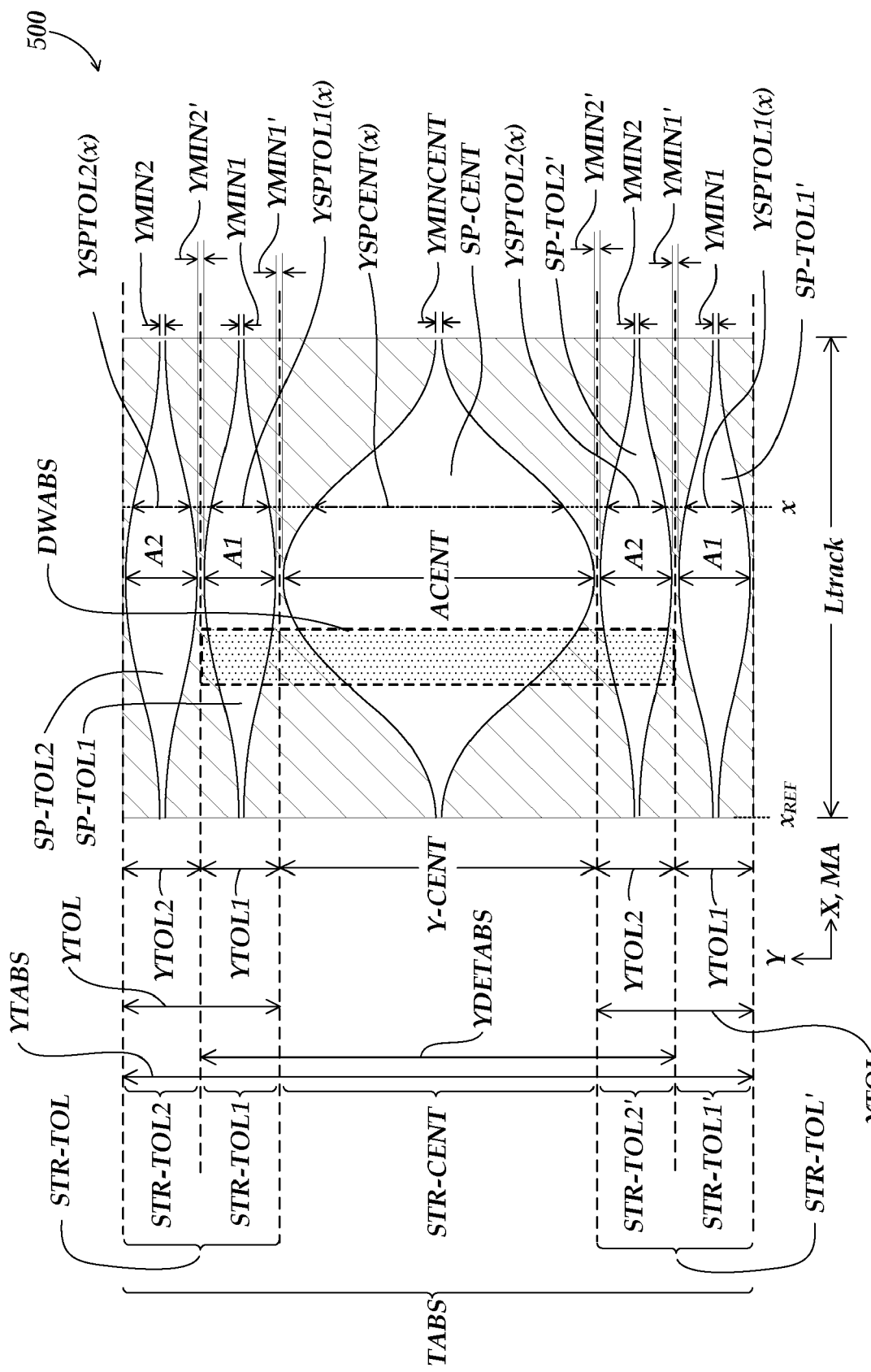
FIG. 5 is a diagram of a first embodiment of an absolute scale track pattern, illustrating certain design principles in accordance with this invention.

FIG. 5 is a diagram 500 of one exemplary embodiment of an absolute track pattern TABS, illustrating certain design principles in accordance with this invention. The absolute track pattern TABS may be adapted to replace any of the absolute track patterns disclosed herein. As shown in FIG. 5, a representative segment (one wavelength Ltrack) of the absolute track pattern TABS includes a central sub track STR-CENT having a respective Y direction dimension YCENT, and misalignment tolerance sub tracks STR-TOL1, STR-TOL2, STR-TOL1', and STR-TOL2', having respective Y direction dimensions Y-TOL1, Y-TOL2, Y-TOL1, and Y-TOL2. Together, the sub tracks STR-TOL1 and STR-TOL2 makeup the overall tolerance sub track STR-TOL, and the sub tracks STR-TOL1' and STR-TOL2' makeup the overall tolerance sub track STR-TOL'). It will be understood that each sub track continues along the direction of the measuring axis MA.

For purposes of explanation, FIG. 5 also shows a nominally aligned representative detector window area DWABS, which corresponds to the detection area of an individual detector element that would be used to sense the spatially modulated light provided by the track pattern TABS. As shown, the absolute track pattern TABS is configured to allow the use of detectors (e.g., those in an absolute detector track) that have a Y direction edge-to-edge dimensions YDETABS (and an overall Y direction dimension) that is less than the Y direction dimension YTABS of the absolute track pattern TABS, while also preserving sinusoidal signal fidelity. In an encoder application, YTOL2 is the amount of misalignment tolerance allowed along a first Y direction between the detector window area DWABS (and/or the corresponding detector track) and the absolute track pattern TABS, and YTOL1 is the amount of misalignment tolerance allowed along the opposite Y direction. The central sub track STR-CENT is dimensioned having a respective Y direction dimension YCENT, such that even if a detector window area DWABS is misaligned to limits of the tolerance sub tracks STR-TOL2 or STR-TOL1', approximately all the light from the pattern portion(s) SP-CENT always falls on the detector window area DWABS. Thus, the resulting signal contributions from SP-CENT correspond to the sinusoidal shape of the pattern portions SP-CENT with sinusoidal fidelity, regardless of misalignment.

As shown in FIG. 5, if a detector window area DWABS is misaligned along the Y direction to fall within the tolerance sub track STR-TOL2, approximately all the light from the pattern portion(s) SP-TOL1 continues to fall on the misaligned detector window area DWABS, such that the resulting signal contributions from the sub track STR-TOL1 correspond to the sinusoidal shape of the pattern portions SP-TOL1 with sinusoidal fidelity. In contrast, some of the light from the pattern portion(s) SP-TOL2' in the sub track STR-TOL2' is "lost light" that will not fall on the misaligned detector window area DWABS. However, according to one aspect of this invention, the absolute track pattern TABS is configured such that the lost light from the pattern portion(s) SP-TOL2' is always compensated by a similar amount of light gained from the pattern portions SP-TOL2, in the sub track STR-TOL2. Thus, the resulting combined signal contributions from the pattern portions SP-TOL2 and SP-TOL2' correspond to the sinusoidal shape of the pattern portions SP-TOL2 and SP-TOL2' with sinusoidal fidelity, regardless of misalignment. This is accomplished if the pattern portions SP-TOL2 and SP-TOL2' are geometrically congruent and coincide when one is translated along the Y direction by a distance of YDETABS (the dimension of the detector window area DWABS) toward the other. Similarly, if the pattern portions SP-TOL1 and SP-TOL1' are geometrically congruent and coincide when one is translated along the Y direction by a distance of YDETABS (the dimension of the detector window area DWABS) toward the other, misalignment in the opposite Y direction will be similarly compensated. In some embodiments described further below, the constituent sub tracks STR-TOL1, STR-TOL2, STR-TOL1', and STR-TOL2' are not so readily distinguished by pattern features. Therefore, it should be appreciated from the foregoing description that overall tolerance sub tracks STR-TOL and STR-TOL' are also geometrically congruent and coincide when one is translated along the Y direction by a distance of YDETABS. This is an alternative, more general, way of describing a desirable characteristic of a tolerance sub track configuration usable according to this invention. Based on the foregoing description, it should be appreciated that in the configuration of FIG. 5 YDETABS always spans the equivalent of the three sinusoidal pattern portions shaped corresponding to the varying dimensions YSPCENT(x), YSPTOL1(x) and YSPTOL2(x). Based on the principles outlined above, regardless of Y direction misalignment, the summed signal components (that is, the total signal) from a detector window area DWABS having a Y direction edge-to-edge dimension YDETABS will have good sinusoidal fidelity.

As shown in FIG. 5, the signal varying pattern portion SP-CENT is shaped corresponding to a maximum Y direction dimension of ACENT, and a minimum Y direction dimension of YMINCENT. Ltrack is the wavelength of the absolute track pattern TABS. The variable dimension YSPCENT(x) that defines the shape of the signal varying pattern portion SP-CENT may be defined as follows:

$$YSPCENT(x) = \quad \text{(Eq. 1)}$$
$$YMINCENT + \left[(\Lambda CENT - YMINCENT)^* \sin\left(\frac{2\pi}{Ltrack}(x - xref)\right)\right]$$

Similarly the variable dimensions YSPTOL2(x) and YSPTOL1(x) that define the shape of the signal varying pattern portions SP-TOL2 and SP-TOL1, respectively, may be defined as follows:

$$YSPTOL2(x) = YMIN2 + \left[(A2 - YMIN2)^* \sin\left(\frac{2\pi}{Ltrack}(x - ref)\right)\right] \quad \text{(Eq. 2)}$$

$$YSPTOL1(x) = YMIN1 + \left[(A1 - YMIN1)^* \sin\left(\frac{2\pi}{Ltrack}(x - ref)\right)\right] \quad \text{(Eq. 3)}$$

In various embodiments, the dimensions YMINCENT, YMIN1 and YMIN2 may be advantageously chosen to be large enough to minimize undesirable diffraction effects (e.g., on the order of 40 microns). In various embodiments, that dimensions YMIN1' and YMIN2' may be advantageously chosen to be approximately as large or larger than an amount of edge blur associated with the edges of the signal varying pattern portions (e.g., on the order of 50 microns in some embodiments). However, in various other embodiments, the dimensions YMIN1' and YMIN2' may be less than this amount, and sufficient sinusoidal signal fidelity may still be obtained. In some embodiments, YTOL1=YTOL2 and/or YMIN1=YMIN2, and/or YMIN1'=YMIN2'. However, these equalities are not necessary, in general.

Figure 6:
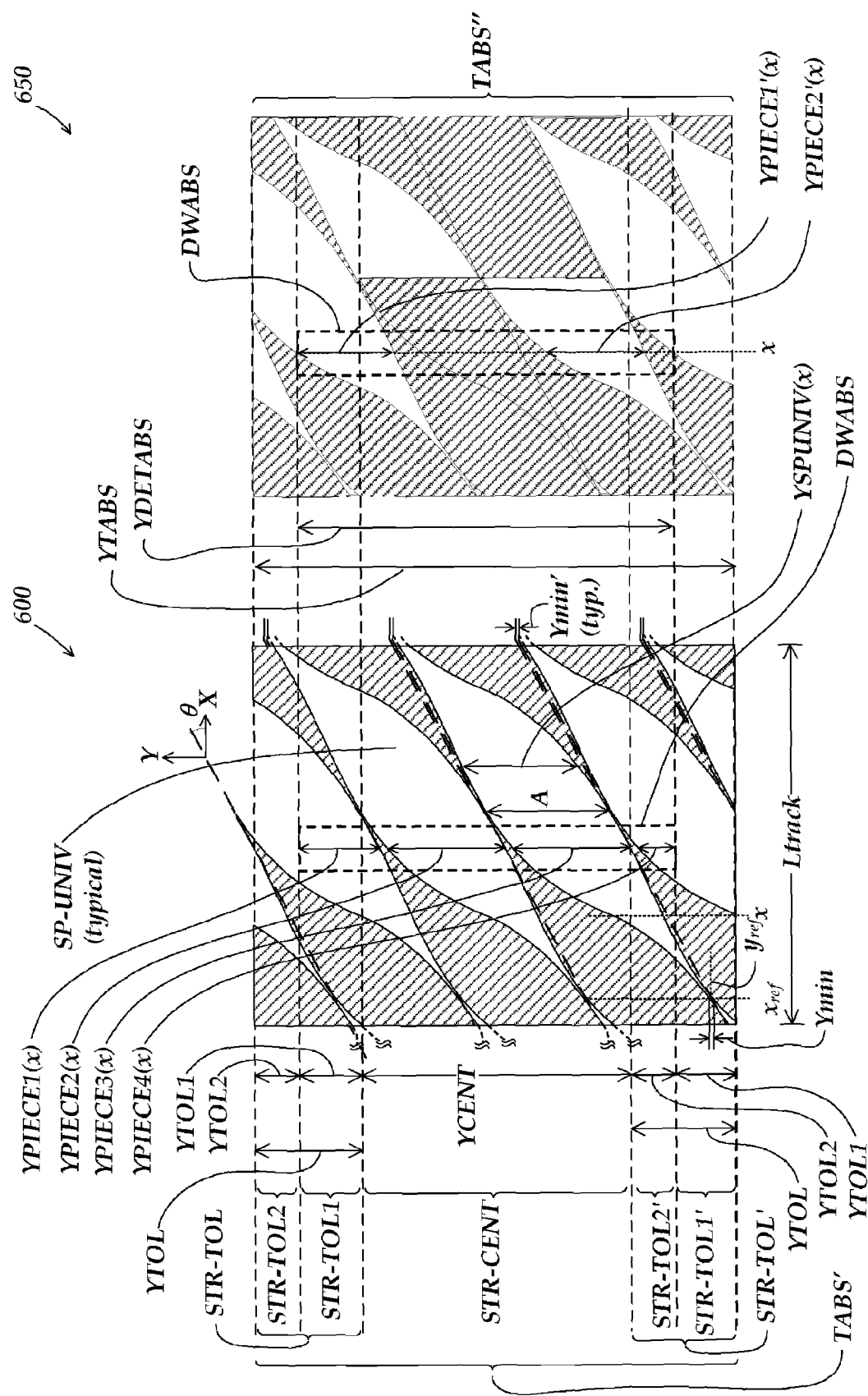
FIG. 6 is a diagram of second and third embodiments of absolute scale track patterns in accordance with this invention.

FIG. 6 includes diagrams 600 and 650 of second and third exemplary embodiments of absolute track patterns TABS' and TABS', respectively, which despite their significantly different appearance, follow certain design principles previously outlined with reference to FIG. 5. Diagrams 600 and 650 share certain dimension lines and/or sub track boundary lines, for easy comparison. Only the significant differences in the configurations of diagrams 600 and 650 in comparison to the configuration of FIG. 5 will be emphasized below. Features which have analogous design considerations and/or analogous functions in FIGS. 5 and 6 are similarly labeled or numbered (e.g., with the same reference label or number, or with one or more prime symbols added), and may be understood by analogy. The absolute track patterns TABS' and TABS'' may be adapted to replace any of the absolute track patterns disclosed herein.

As shown in diagram 600 a representative segment (one wavelength) of the absolute track pattern TABS' includes a central sub track STR-CENT having respective Y direction dimension YCENT, and misalignment tolerance sub tracks STR-TOL1, STR-TOL2, STR-TOL1', and STR-TOL2', having respective Y direction dimensions Y-TOL1, Y-TOL2, Y-TOL1, and Y-TOL2. It will be understood that each sub track continues along the direction of the measuring axis MA. A nominally aligned representative detector window area DWABS corresponds to the detection area of an individual detector element that would be used to sense the spatially modulated light provided by the track pattern TABS'. The absolute track pattern TABS' is configured to allow the use of detectors that have a Y direction edge-to-edge dimensions YDETABS (and an overall Y direction dimension) that is less than the Y direction dimension YTABS of the absolute track pattern TABS', while also preserving sinusoidal signal fidelity.

In contrast to the track pattern shown in FIG. 5, the track pattern TABS' comprises a single type or shape of patterned signal varying portion SP-UNIV (also referred to as a signal varying element) that is repeated along two directions. The track pattern TABS' has a wavelength Ltrack along the X direction. The patterned signal varying element SP-UNIV is repeated along a first direction defined by a pattern angle θ relative to the X direction, and is also repeated along the Y direction as illustrated, as described in greater detail below. The central sub track STR-CENT may be understood to have a Y direction dimension YCENT, such that even if a detector window area DWABS is misaligned to limits of the tolerance sub tracks STR-TOL2 or STR-TOL1', approximately all the light from the portions of the patterned signal varying elements SP-UNIV that are located within the sub-track STR-CENT always falls on the detector window area DWABS. In contrast to the absolute track pattern configuration shown in FIG. 5, the signal contribution from the sub track STR-CENT in isolation need not correspond to a sinusoidal shape confined to the sub track STR-CENT, because of the patterned signal varying elements SP-UNIV are shaped and arranged such that the total integrated signal from a detector window area DWABS will have good sinusoidal fidelity, as explained in greater detail below.

As shown in FIG. 6, if a detector window area DWABS is misaligned to fall within the tolerance sub track STR-TOL2, approximately all the light from the portions of the patterned signal varying elements SP-UNIV that are located within the sub-track STR-TOL1 continues to fall on the misaligned detector window area DWABS. In contrast, some of the light from the portions of the patterned signal varying elements SP-UNIV that are located within the sub-track STR-TOL2' is "lost light" that will not fall on the misaligned detector window area DWABS. However, the size and repetition arrangement of the patterned signal varying elements SP-UNIV is such that the lost light from the portions of the patterned signal varying elements SP-UNIV that are located within the sub-track STR-TOL2' is always compensated by a similar amount of light gained from the portions of the patterned signal varying elements SP-UNIV that are located within the sub track STR-TOL2. That is, the patterned signal varying elements SP-UNIV have a size and repetition arrangement, described in greater detail below, such that the resulting combined signal contributions from the portions of the patterned signal varying elements SP-UNIV in sub tracks STR-TOL2 and STR-TOL2' is insensitive to Y direction misalignment of the detector window area DWABS. One condition for this to be accomplished is that portions of the patterned signal varying elements SP-UNIV in sub tracks STR-TOL2 and STR-TOL2' are geometrically congruent and coincide when portions of the patterned signal varying elements SP-UNIV in one of the sub tracks STR-TOL2 or STR-TOL2' are translated along the Y direction by a distance of YDETABS (the Y direction dimension of the detector window area DWABS) toward the other of the sub tracks STR-TOL2 or STR-TOL2'.

In a similar manner, if the portions of the patterned signal varying elements SP-UNIV in sub tracks STR-TOL1 and STR-TOL1' are geometrically congruent and coincide when portions of the patterned signal varying elements SP-UNIV in one of the sub tracks STR-TOL1 or STR-TOL1' are translated along the Y direction by a distance of YDETABS (the dimension of the detector window area DWABS) toward the other of the sub tracks STR-TOL1 or STR-TOL1', then misalignment in the opposite Y direction will be similarly compensated.

That is, the patterned signal varying elements SP-UNIV have a size and repetition arrangement such that the resulting combined signal contributions from the portions of the patterned signal varying elements SP-UNIV in sub tracks STR-TOL1 and STR-TOL1' is insensitive to Y direction misalignment of the detector window area DWABS.

It should be appreciated from the foregoing description that overall tolerance sub tracks STR-TOL and STR-TOL' are also geometrically congruent and coincide when one is translated along the Y direction by a distance of YDETABS. As previously indicated, this is an alternative, more general, way of describing a desirable characteristic of a tolerance sub track configuration usable according to this invention. Based on the foregoing description, it should be appreciated that in the configuration of the diagram 600, the edge-to-edge dimension YDETABS of the detector window area DWABS, which is the Y direction edge-to-edge dimension of the corresponding detector elements, spans the equivalent of three units of the patterned signal varying elements SP-UNIV. Thus, based on the principles outlined above, regardless of Y direction misalignment, the summed signal components (that is, the total signal) from a detector window area DWABS will have good sinusoidal fidelity. More generally, it will be appreciated based on the foregoing description, that in a configuration similar to that of the diagram 600, if the edge-to-edge dimension YDETABS of the detector window area DWABS always spans the equivalent of an integer number of units of a sinusoidal pattern, then regardless of Y direction misalignment, the summed signal components (that is, the total signal) from a such a detector window area DWABS will have good sinusoidal fidelity.

The size and repetition arrangement of the patterned signal varying elements SP-UNIV may be described as follows. As shown in FIG. 6, the patterned signal varying elements SP-UNIV are based on a pattern shape having a maximum Y direction dimension of A, and a minimum Y direction dimension of YMIN. Ltrack is the wavelength of the absolute track pattern TABS'. The variable Y-direction dimension YSPUNIV(x) that partially defines the shape of each of the patterned signal varying elements SP-UNIV may be defined as follows:

$$YSPUNIV(x) = YMIN + \left[(A - YMIN)^* \sin\left(\frac{2\pi}{Ltrack}(x - xref)\right)\right] \quad \text{(Eq. 4)}$$

Within each patterned signal varying element SP-UNIV, the location Yoffset(x) of the center of the variable Y-direction dimension YSPUNIV(x), which further defines the shape of each patterned signal varying element SP-UNIV, may be defined as:

$$YOffset(x) = yref + x \tan \theta \quad \text{(Eq. 5)}$$

A suitably chosen non-zero pattern angle θ may tend to preserve sinusoidal fidelity despite dynamic changes in alignment, in comparison to a zero pattern angle θ. In some embodiments a pattern angle of at least 10, 20, or 30 degrees or more may be advantageous. However, in some embodiments, a zero pattern angle may be used and sufficient sinusoidal fidelity may still be obtained.

The Y direction dimensions A and YMIN' and YDETABS are chosen to satisfy the condition:

$$N^*(A+YMIN')=YDETABS \quad \text{(Eq. 6)}$$

where N is an integer (e.g., N=3 in the diagram 600). If YMIN' is allowed to be approximately zero in some embodiments, then the maximum Y direction dimension A can be at most (YDETABS1/N). In any case, regardless of the value of YMIN' the patterned signal varying elements SP-UNIV may be repeated along the Y direction at steps of nominally [YDETABS1/N], in order to preserve sinusoidal fidelity, according to principles outlined above. Of course, various signal varying elements SP-UNIV in the pattern may be subject to truncation at Y direction limits of the first absolute track pattern, but it will be understood that the underlying shape of any patterned signal varying element that is truncated at the track pattern limits may be understood essentially as outlined herein.

A larger integer N may tend to preserve sinusoidal fidelity despite lighting non-uniformities. However, a smaller integer N will provide larger pattern elements, which may provide better overall contrast in the spatially modulated light in comparison to smaller pattern elements. In some embodiments that use narrow tracks (e.g., on the order of 1-2 millimeters) an advantageous balance between these factors may be provided when N is in the range of 3 to 7. However, in various embodiments it may be advantageous for N to fall outside this range (e.g., for wider tracks, or less expected blur, or the like.)

EQUATION 6 provides a repetition arrangement such that the portions of the patterned signal varying elements SP-UNIV in sub tracks STR-TOL1 and STR-TOL1' are geometrically congruent and coincide when portions of the patterned signal varying elements SP-UNIV in one of the sub tracks STR-TOL1 or STR-TOL1' are translated along the Y direction by a distance of YDETABS (the dimension of the detector window area DWABS) toward the other of the sub tracks STR-TOL1 or STR-TOL1'. This repetition arrangement also insures that the portions of the patterned signal varying elements SP-UNIV in sub tracks STR-TOL2 and STR-TOL2' are geometrically congruent and coincide when portions of the patterned signal varying elements SP-UNIV in one of the sub tracks STR-TOL2 or STR-TOL2' are translated along the Y direction by a distance of YDETABS (the dimension of the detector window area DWABS) toward the other of the sub tracks STR-TOL2 or STR-TOL2'. It should be appreciated from the foregoing description that overall tolerance sub tracks STR-TOL and STR-TOL' are also geometrically congruent and coincide when one is translated along the Y direction by a distance of YDETABS. As previously indicated, this is an alternative, more general, way of describing a desirable characteristic of a tolerance sub track configuration usable according to this invention. The repetition arrangement outlined here insures that the summed signal components (that is, the total signal) from a detector window area DWABS having a Y direction edge-to-edge dimension YDETABS will have good sinusoidal fidelity, regardless of Y direction misalignment.

In various embodiments, the dimension YMIN may be the narrowest feature in a signal varying elements, and may be advantageously chosen to be large enough to minimize undesirable diffraction effects (e.g., on the order of at least 30 or 40 microns). However, in various other embodiments, the dimension YMIN may be less than this amount, and sufficient sinusoidal signal fidelity may still be obtained. In various embodiments, the dimension YMIN' may be advantageously chosen to be approximately as large or larger than an amount of edge blur associated with the edges of the signal varying patterned signal varying elements SP-UNIV (e.g., on the order of 50 microns in some embodiments). However, in various other embodiments, the dimension YMIN' may be less than this amount, and sufficient sinusoidal signal fidelity may still be obtained. In some embodiments, YTOL1=YTOL2. However, this equality is not necessary in the general case.

Based on the foregoing description, it should be appreciated that at any position x, the Y direction dimensions YPIECEi(x) of the patterned signal varying elements SP-UNIV that fall within the detector window area DWABS (e.g., the example portions YPIECE1(x)-YPIECE4(x) shown in the diagram 600) sum together to satisfy the condition:

$$\sum_i YPIECEi(x) = \qquad (\text{Eq. 7})$$

$$N^* \left[ YMIN + \left[ (A - YMIN)^* \sin\left( \frac{2\pi}{Ltrack}(x - xref) \right) \right] \right]$$

EQUATION 7 provides a total Y direction dimension (of combined signal varying elements) that varies as a sinusoidal function of x. Thus, according to previously described principles, the resulting combined or integrated signal contributions from the portions of signal varying pattern elements of the ABS track pattern TABS' provide good sinusoidal fidelity, regardless of Y direction misalignment.

The diagram 650 shows an absolute track pattern TABS", which is identical to the scale track pattern TABS' shown in the diagram 600, except that the equivalent of one complete patterned signal varying element SP-UNIV has been eliminated in the sub track STR-CENT. Based on the foregoing description, it should be appreciated that in the diagram 650 at any position x, the Y direction dimensions YPIECEi'(x) of the patterned signal varying elements SP-UNIV that fall within the detector window area DWABS (e.g., the example portions YPIECE1'(x) and YPIECE2'(x) shown in the diagram 650) sum together to satisfy the condition:

$$\sum_i YPIECEi'(x) = \qquad (\text{Eq. 8})$$

$$(N-1)^* \left[ YMIN + \left[ (A - YMIN)^* \sin\left( \frac{2\pi}{Ltrack}(x - xref) \right) \right] \right]$$

(N−1)=2 in the diagram 650. EQUATION 8 provides a total Y direction dimension that varies as a sinusoidal function of x. Stated another way, it will be appreciated that despite their apparent discontinuities, the patterned signal varying elements are configured such that when their areas are integrated over a signal integration window, such as the detector window area DWABS, their integrated area varies as a sinusoidal function of x. Thus, according to previously described principles, the resulting combined signal contributions from the portions of patterned signal varying elements of the ABS track pattern TABS" provide good sinusoidal fidelity, regardless of Y direction misalignment. This example, although its pattern configuration does not provide the best possible S/N ratio, illustrates that a variety of absolute track patterns according to this invention may be determined in accordance with previously outlined principles. Thus, the absolute track pattern embodiments disclosed herein are exemplary only, and not limiting.

Figure 7:
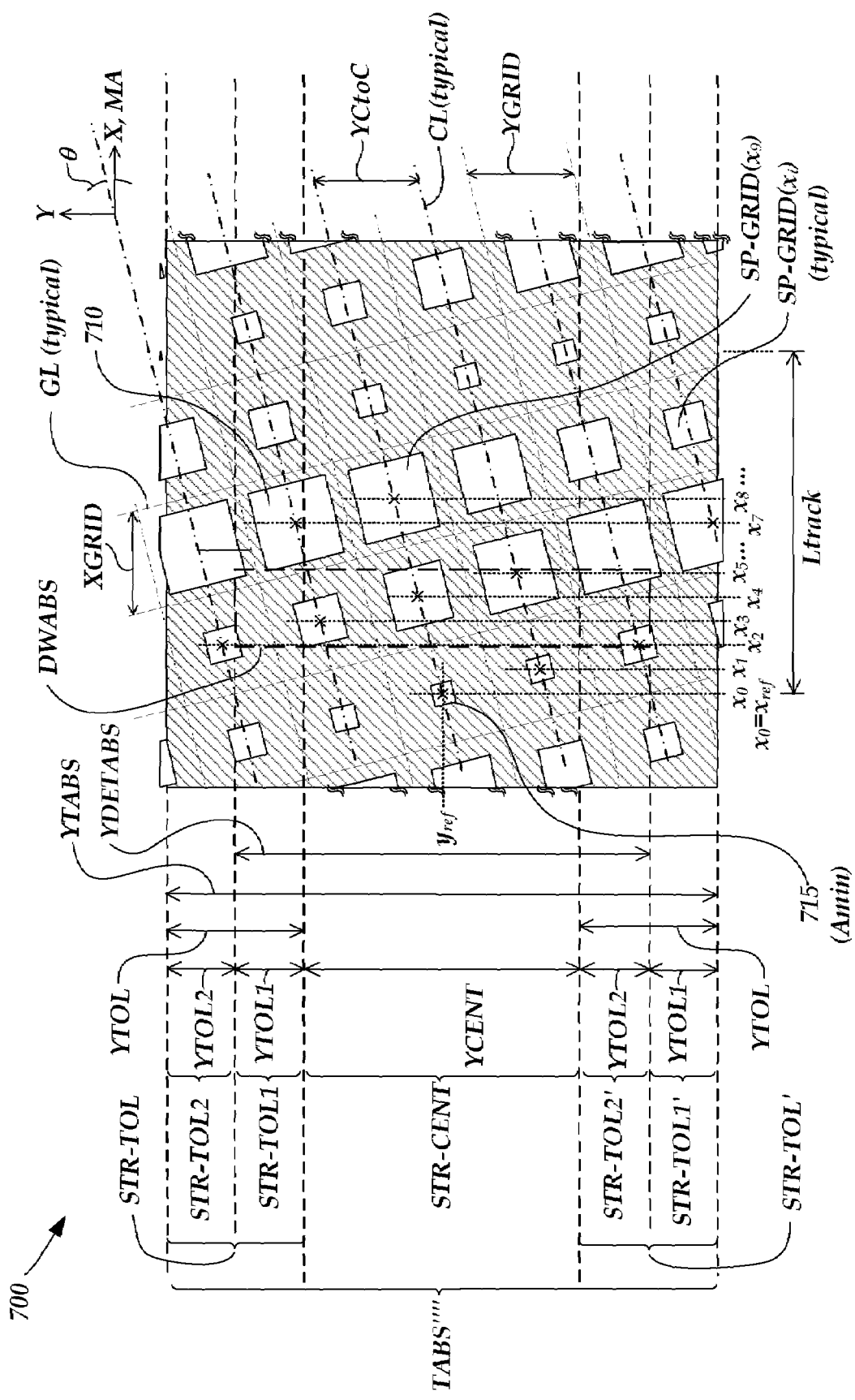
FIG. 7 is a diagram of a fourth embodiment of an absolute scale track pattern in accordance with this invention.

FIG. 7 includes a diagram 700 of a fourth exemplary embodiment of an absolute track pattern TABS''', which despite its significantly different appearance, follows certain design principles previously outlined with reference to FIGS. 5 and 6. Only the significance differences in the configuration of the diagram 700 in comparison to the configurations of FIGS. 5 and 6 will be emphasized below. Features which have analogous design considerations and/or analogous functions in FIGS. 7, 5 and 6 are similarly labeled or numbered (e.g., with the same reference label or number, or with one or more prime symbols added), and may be understood by analogy. The absolute track pattern TABS''' may be adapted to replace any of the absolute track patterns disclosed herein.

As shown in diagram 700 a representative segment (one wavelength) of the absolute track pattern TABS''' includes a central sub track STR-CENT having respective Y direction dimension YCENT, and misalignment tolerance sub tracks STR-TOL1, STR-TOL2, STR-TOL1', and STR-TOL2', having respective Y direction dimensions Y-TOL1, Y-TOL2, Y-TOL1, and Y-TOL2. It will be understood that each sub track continues along the direction of the measuring axis MA. A nominally aligned representative detector window area DWABS corresponds to the detection area of an individual detector element that would be used to sense the spatially modulated light provided by the track pattern TABS'''. The absolute track pattern TABS''' is configured to allow the use of detectors that have a Y direction edge-to-edge dimension YDETABS (and an overall Y direction dimension) that is less than the Y direction dimension YTABS of the absolute track pattern TABS''', while also preserving sinusoidal signal fidelity.

In contrast to the track patterns shown in FIGS. 5 and 6, which are generally generated based on continuous sine functions, the track pattern TABS''' comprises patterned signal varying elements SP-GRID($x_i$) (e.g., SP-GRID($x_9$), shown in FIG. 7) which are generated based on a discrete sine function having a wavelength Ltrack along the X direction, as described in greater detail below. The signal varying elements SP-GRID($x_i$) may be repeated at a spacing based on a two dimensional spacing grid that defines grid units or cells of a uniform size, as indicated by the dashed grid lines GL in FIG. 7. The grid may aligned along a pattern angle θ and with a dimension YGRID along the Y direction, and with a dimension XGRID along the X direction, as illustrated in FIG. 7 and as described in greater detail below. Along the Y-direction, the signal varying elements SP-GRID($x_i$) may be repeated along center lines CL at a center-to-center spacing YCtoC=YGRID. The signal varying elements SP-GRID($x_i$) have a shape, orientation, size and repetition arrangement (e.g., according to the grid spacing), such that the total integrated signal from a detector window area DWABS will have sufficient sinusoidal fidelity regardless of Y direction misalignment, as explained in greater detail below.

The central sub track STR-CENT may be understood to have a Y direction dimension YCENT, such that even if a detector window area DWABS is misaligned to limits of the tolerance sub tracks STR-TOL2 or STR-TOL1', approximately all the light from the portions of the signal varying elements SP-GRID($x_i$) that are located within the sub-track STR-CENT always falls on the detector window area DWABS. As shown in FIG. 7, if a detector window area DWABS is misaligned to fall within the tolerance sub track STR-TOL2, approximately all the light from the portions of the signal varying elements SP-GRID($x_i$) that are located within the sub-track STR-TOL1 continues to fall on the misaligned detector window area DWABS. In contrast, some of the light from the portions of the signal varying elements SP-GRID($x_i$) that are located within the sub-track STR-TOL2' is "lost light" that will not fall on the misaligned detector window area DWABS. However, the size and repetition arrangement of the signal varying elements SP-GRID($x_i$) is such that the lost light from the portions of the signal varying elements SP-GRID($x_i$) that are located within the sub-track STR-TOL2' is always compensated by a similar amount of light gained from the portions of the signal varying elements SP-GRID($x_i$) that are located within the sub track STR-TOL2. That is, the signal varying elements SP-GRID ($x_i$) have a size and repetition arrangement, described in greater detail below, such that the resulting combined signal contributions from the portions of the signal varying elements SP-GRID($x_i$) in sub tracks STR-TOL2 and STR-TOL2' is insensitive to Y direction misalignment of the detector window area DWABS. One condition for this to be accomplished is that portions of the signal varying elements SP-GRID($x_i$) in sub tracks STR-TOL2 and STR-TOL2' are geometrically congruent and coincide when portions of the signal varying elements SP-GRID($x_i$) in one of the sub tracks STR-TOL2 or STR-TOL2' are translated along the Y direction by a distance of YDETABS (the Y direction dimension of the detector window area DWABS) toward the other of the sub tracks STR-TOL2 or STR-TOL2'.

In a similar manner, if the portions of the signal varying elements SP-GRID($x_i$) in sub tracks STR-TOL1 and STR-TOL1' are geometrically congruent and coincide when portions of the signal varying elements SP-GRID($x_i$) in one of the sub tracks STR-TOL1 or STR-TOL1' are translated along the Y direction by a distance of YDETABS (the dimension of the detector window area DWABS) toward the other of the sub tracks STR-TOL1 or STR-TOL1', then misalignment in the opposite Y direction will be similarly compensated. That is, the signal varying elements SP-GRID($x_i$) have a size and repetition arrangement, described in greater detail below, such that the resulting combined signal contributions from the portions of the signal varying elements SP-GRID($x_i$) in sub tracks STR-TOL1 and STR-TOL1' is insensitive to Y direction misalignment. It should be appreciated from the foregoing description that overall tolerance sub tracks STR-TOL and STR-TOL' are also geometrically congruent and coincide when one is translated along the Y direction by a distance of YDETABS. Based on the foregoing description, it should be appreciated that in the configuration of the diagram 700, the edge-to-edge dimension YDETABS of the detector window area DWABS always spans the equivalent of four grid units along the Y direction (e.g., 4*YGRID), which is the dimension at which the track pattern TABS''' repeats along the Y direction. Thus, based on the principles outlined above, regardless of Y direction misalignment, the summed signal components (that is, the total signal) from a detector window area DWABS will be insensitive to Y direction misalignment. Furthermore, the size and repetition arrangement of the signal varying elements SP-GRID($x_i$) may be determined as outlined below, such that regardless of Y direction misalignment, the summed signal components (that is, the total signal) from a such a detector window area DWABS will have sufficiently good sinusoidal fidelity.

The size and repetition arrangement of the signal varying elements SP-GRID($x_i$) may be described as follows. The signal varying elements SP-GRID($x_i$) may have a maximum area Amax and/or corresponding maximum dimensions (e.g., approximately as shown by a representative signal varying element 710, which has nearly the maximum area Amax), and a minimum area Amin and/or corresponding minimum dimensions, as shown by a representative minimum area signal varying element 715. In general, any convenient shape may be used for the patterned signal generating elements. The maximum area and/or maximum signal varying element dimensions may be chosen in relation to the grid dimensions YGRID and XGRID to satisfy desired signal varying element spacing and/or pattern generation and/or scale fabrication constraints. In general, also, the minimum area and/or minimum signal varying element dimensions may be chosen to satisfy similar constraints, and also to provide signal varying element dimensions for the narrowest features of the signal varying elements (e.g., a width or diameter dimension along a direction normal to a boundary of the narrowest feature) that are large enough (e.g., at least 30, 40 or 50 microns, in various embodiments) to suppress undesirable diffraction effects that may disrupt sinusoidal fidelity).

More generally, within the maximum and minimum area or dimension limits outlined above, each signal varying element SP-GRID($x_i$) may have an area ASP($x_i$) that is determined according to a discrete sinusoidal function of ($x_i$), as described below. Ltrack is the wavelength of the absolute track pattern TABS''''. The variable area ASP($x_i$) that defines the size of each of the patterned signal varying elements SP-GRID($x_i$) may be defined as follows:

$$ASP(x_i) = A\min + \left[(A\max - A\min)^* \sin\left(\frac{2\pi}{Ltrack}(x_i - xref)\right)\right] \quad \text{(Eq. 9)}$$

In various embodiments, each patterned signal varying element SP-GRID($x_i$) may be centered or arranged corresponding to the center of a unit of the grid, with the center of that gird unit defining the discrete x value ($x_i$) that is used in determining the area ASP($x_i$) of that patterned signal varying element. Of course, various signal varying elements SP-GRID($x_i$) in the pattern may be subject to truncation at Y direction limits of the absolute track pattern, but it will be understood that the underlying shape or area of any patterned signal varying element that is truncated at the track pattern limits may be understood as outlined herein.

A suitably chosen non-zero pattern angle θ may tend to preserve sinusoidal fidelity despite dynamic changes in alignment, in comparison to a zero pattern angle θ. In some embodiments a pattern angle of at least 10, 20, or 30 degrees or more may be advantageous. However, in some embodiments, a zero pattern angle may be used and sufficient sinusoidal fidelity may still be obtained, particularly if each signal varying element is shaped and/or orientated such that a significant portion of its edges are not aligned along the Y direction (e.g., the signal varying elements may be "rotated" squares or rectangles, circles, hexagons, or a combination thereof, or the like.) In various embodiments, The Y direction dimensions YGRID and YDETABS are chosen to satisfy the condition:

$$N^*(YGRID) = YDETABS \quad \text{(Eq. 10)}$$

where N is an integer (e.g., N=4 in the diagram 700). In various embodiments, the pattern angle θ, and the X direction dimension XGRID may then be chosen to satisfy the relation:

$$XGRID = \tan\theta^*(N^*YGRID) \quad \text{(Eq. 11)}$$

or more generally, in other embodiments, to satisfy the relation:

$$M^*XGRID = \tan\theta^*(N^*YGRID) \quad \text{(Eq. 12)}$$

where M is an integer.

Based on the foregoing description, it should be appreciated that EQUATIONS 10 and 11 provide a repetition arrangement such that the portions of the signal varying elements SP-GRID($x_i$) in sub tracks STR-TOL1 and STR-TOL1' are geometrically congruent and coincide when portions of the signal varying elements SP-GRID($x_i$) in one of the sub tracks STR-TOL1 or STR-TOL1' are translated along the Y direction by a distance of YDETABS (the dimension of the detector window area DWABS) toward the other of the sub tracks STR-TOL1 or STR-TOL1'. This repetition arrangement also insures that the portions of the signal varying elements SP-GRID($x_i$) in sub tracks STR-TOL2 and STR-TOL2' are geometrically congruent and coincide when portions of the signal varying elements SP-GRID($x_i$) in one of the sub tracks STR-TOL2 or STR-TOL2' are translated along the Y direction by a distance of YDETABS (the dimension of the detector window area DWABS) toward the other of the sub tracks STR-TOL2 or STR-TOL2'. It should be appreciated from the foregoing description that overall tolerance sub tracks STR-TOL and STR-TOL' are also geometrically congruent and coincide when one is translated along the Y direction by a distance of YDETABS. As previously indicated, this is an alternative, more general, way of describing a desirable characteristic of a tolerance sub track configuration usable according to this invention. Accordingly, regardless of Y direction misalignment, the summed signal components (that is, the total signal) from a detector window area DWABS will be insensitive to Y direction misalignment. Furthermore, it will be appreciated that with signal varying element areas chosen according to the discrete sine function of EQUATION 9, the signal varying areas of the of the absolute track pattern TABS'" may be distributed along the measuring axis so to provide an approximately sinusoidal signal variation in the detector window area DWABS (e.g., based on the window-averaged signal varying area density), with sufficient sinusoidal fidelity, as the detector window area DWABS is moved along the measuring axis. In one embodiment, an absolute track similar to that shown in FIG. 7 may approximately correspond to YDETBS=1.0 millimeter, YGRID=XGRID=0.250 millimeter, pattern angle $\theta$=14 degrees, N=4, Amin=0.0025 square millimeters, Ltrack=0.8 mm. However, this embodiment is exemplary only, and not limiting.

A larger integer N may tend to preserve sinusoidal fidelity despite lighting non-uniformities, and may tend to smooth out the provided sinusoidal signal variation. However, a smaller integer N will provide larger signal varying elements, which may provide better overall contrast in the spatially modulated light in comparison to smaller signal varying elements. In some embodiments that use narrow tracks (e.g., on the order of 1-2 millimeters) an advantageous balance between these factors may be provided when N is in the range of 3 to 7. However, in various embodiments it may be advantageous for N to fall outside this range (e.g., for wider tracks, or more or less expected blur, or the like.)

It will be appreciated that in various embodiments an encoder formed in accordance with the present invention provides a signal with good sinusoidal fidelity along the measuring axis direction and a signal that is insensitive to misalignments along the Y direction, despite having a detector dimension that is narrower than the width of a scale track that provides the detected signal. In some embodiments, this may be achieved using a scale pattern that includes an optional integer relationship between a pattern repetition arrangement and/or feature size that follows an integer relationship relative to the detector dimension. In various embodiments, an encoder formed in accordance with the present invention may be relatively insensitive to light non-uniformities because the detected signal is based on multiple relatively similar scale pattern elements distributed within a given detector window. In various embodiments, an encoder formed in accordance with the present invention includes an absolute scale track pattern that avoids small, diffraction producing features. In various embodiments, the encoder may include absolute measurement tracks that are straight-forwardly compatible with the same collimated, partially coherent light source that is used for self imaging or interference type scale tracks in the encoder, so that an absolute measurement device with high resolution can be economically provided. In various embodiments, the encoder may include absolute measurement tracks configured to provide fundamentally sinusoidal signal varying area variation, such that there is insignificant variation in the spatial harmonic content in the resulting measurement signal, regardless of the amount of variation in blur of the measurement track pattern on the detector (e.g., due to detector gap variations, or the like).

While the embodiments outlined above have emphasized particularly advantageous configurations wherein areas and/or shapes are based on sinusoidal periodic functions, in other embodiments the areas and/or shapes may be based on quasi-sinusoidal functions and an advantageous configuration may still result, with a sinusoidal fidelity that may still be sufficient for various applications. In particular, a suitable quasi-sinusoidal function may have significantly less high-frequency spatial harmonic content than a square wave, in order to provide a sufficient level of sinusoidal fidelity and signal stability without the need for precise gap control, or the like. In various embodiments, suitable quasi-sinusoidal functions may include a triangular wave function, or a trapezoidal wave function, or the like. In various embodiments, the spatially modulated light pattern output from a quasi-sinusoidal pattern may simply be slightly blurred (e.g., by slightly uncollimated illumination or other known techniques), to enhance the resulting sinusoidal fidelity to a sufficient level for various applications.

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. An encoder configuration for use in an absolute position sensing device usable to measure a relative position between two elements along a measuring axis direction, the encoder configuration comprising:

an illumination portion;

a scale element including an absolute scale pattern comprising a fine track pattern and at least a first absolute track pattern arranged to receive light from the illumination portion and output respective spatially modulated light patterns along respective light paths, each track pattern extending along the measuring axis direction; and a detector electronics comprising a fine track detector portion and at least a first absolute track detector portion arranged in a fixed relationship relative to the illumination portion, and arranged to receive spatially modulated light patterns from the fine track pattern and the first absolute track pattern, respectively, wherein:

the first absolute track detector portion comprises individual photodetector areas that have a Y direction edge-to-edge dimension YDETABS1 along a Y direction that is perpendicular to the measuring axis direction, and the first absolute track detector portion is configured to spatially filter its received spatially modulated light pattern and output a plurality of respective position indicating signals that have respective spatial phases, wherein:
  the first absolute track pattern comprises geometrically congruent subtrack portions that extend along the measuring axis direction, the geometrically congruent subtrack portions configured such that:
    the geometrically congruent subtrack portions are separated along the Y direction by a dimension YCENT, and YCENT is less than YDETABS1,
    the geometrically congruent subtrack portions each have a Y direction dimension YTOL, such that the dimensional quantity [YCENT+2(YTOL)] is greater than YDETABS1, and
  the geometrically congruent subtrack portions are arranged such that if one of the geometrically congruent portions is translated along the Y direction by the dimension YDETABS1, then the geometrically congruent portions will nominally coincide; and
  the first absolute track pattern comprises patterned signal varying portions configured such that an area of the patterned signal varying portions varies corresponding to a first periodic function of x having a spatial wavelength L1, where x designates an x-coordinate location along the measuring axis direction, and the first periodic function is not a square wave.

2. The encoder configuration of claim 1, wherein the patterned signal varying portions are configured such that an integrated area of the patterned signal varying portions varies corresponding to the first periodic function of x, and that integrated area is determined by integrating over a signal integration window that is positioned over the first absolute track pattern along the measuring axis direction at the x-coordinates, and the dimensions and alignment of the signal integration window correspond to the dimensions and nominal operating alignment of one of the individual photodetector areas.

3. The encoder configuration of claim 2, wherein the first periodic function is nominally a sinusoidal function.

4. The encoder configuration of claim 1, wherein:
  the first periodic function is one of a quasi-sinusoidal function and sinusoidal function; and
  the first absolute track pattern comprises a plurality of respective patterned signal varying portions that are configured based on respective pattern shapes having a Y direction dimension that varies corresponding to the first periodic function of x, and for each respective pattern shape the varying Y direction dimension has a maximum value that is less than YDETABS1.

5. The encoder configuration of claim 4, wherein the first periodic function is a sinusoidal function.

6. The encoder configuration of claim 4, wherein some of the plurality of respective patterned signal varying portions based on the respective pattern shapes are truncated at a Y direction limit of the first absolute track pattern.

7. The encoder configuration of claim 4, wherein a first one of the plurality of patterned signal varying portions is configured based on respective pattern shapes having a varying Y direction dimension that has a first maximum value, and a second one of the plurality of patterned signal varying portions is configured based on respective pattern shape having a varying Y direction dimension that has a second maximum value.

8. The encoder configuration of claim 4, each of the respective patterned signal varying portions of the first absolute track pattern is configured based on a respective pattern shape that is the same universal pattern shape wherein the varying Y direction dimension has the same maximum value in each instance.

9. The encoder configuration of claim 8, wherein, within each spatial wavelength increment of the first absolute track pattern:
  the respective patterned signal varying portions are configured based on a universal pattern shape wherein the varying Y direction dimension has a maximum value that is at most [YDETABS1/N], where N is an integer; and
  the respective patterned signal varying portions are repeated along the Y direction at steps of nominally [YDETABS1/N], subject to potential truncation at Y direction limits of the first absolute track pattern.

10. The encoder configuration of claim 9, wherein, in the universal pattern shape, the varying Y direction dimension that is a periodic function of x has a center location YOffset(x) that is offset along the Y direction as a function of x.

11. The encoder configuration of claim 10, wherein the center location YOFFSET(x) is offset along the Y direction as a linear function of x, such that a set of center locations YOFFSET(x) are aligned along a pattern angle THETA relative to the measuring axis direction.

12. The encoder configuration of claim 11, wherein N is at least 3 and at most 7, and THETA is at least 10 degrees.

13. The encoder configuration of claim 4, each of the respective patterned signal varying portions of the first absolute track pattern are configured such that their narrowest features are at least 30 microns wide, subject to potential truncation at Y direction limits of the first absolute track pattern.

14. The encoder configuration of claim 13, wherein their narrowest features are at least 40 microns wide.

15. The encoder configuration of claim 1, wherein:
  the first periodic function is one of a discrete quasi-sinusoidal function and a discrete sinusoidal function; and
  the first absolute track pattern comprises a plurality of respective discrete patterned signal varying portions having respective areas that vary corresponding to the first periodic function of x, and each respective discrete patterned signal varying portion has a maximum dimension along the Y direction that is less than YDETABS1.

16. The encoder configuration of claim 15, wherein the first periodic function is a discrete sinusoidal function.

17. The encoder configuration of claim 15, wherein some of the plurality of respective discrete patterned signal varying portions are truncated at a Y direction limit of the first absolute track pattern.

18. The encoder configuration of claim 15, wherein the plurality of respective discrete patterned signal varying portions have centers that are arranged corresponding to the centers of grid units in a two-dimensional spacing grid, wherein all the grid units have a uniform size and along the Y direction successive grid unit boundaries are spaced apart by a Y direction dimension YGRID=YDETABS/N, where N is an integer that is at least 3.

19. The encoder configuration of claim 18, wherein the two-dimensional spacing grid has one axis of the grid oriented at a pattern angle THETA relative to the measuring axis direction, along the measuring axis direction successive grid unit boundaries are spaced apart by a dimension XGRID, and YGRID, XGRID and THETA satisfy the expression M*XGRID=[tan(THETA)*(N*YGRID)], where M is an integer.

20. The encoder configuration of claim 19, wherein THETA is at least 10 degrees.

21. The encoder configuration of claim 15, wherein each of the respective discrete patterned signal varying portions of the first absolute track pattern are configured such that their narrowest features are at least 30 microns wide, subject to potential truncation at Y direction limits of the first absolute track pattern.

22. The encoder configuration of claim 21, wherein their narrowest features are at least 40 microns wide.

23. The encoder configuration of claim 1, wherein the illumination portion comprises a single light source, the fine track pattern and the at least a first absolute track pattern are coplanar, and the fine track detector portion and the at least a first absolute track detector portion are coplanar.

24. The encoder configuration of claim 23, wherein the fine track pattern is configured to provide a respective spatially modulated light pattern that is at least one of a self image pattern and an interference pattern.

25. The encoder configuration of claim 24, wherein the spatial wavelength L1 of the first absolute track pattern is at least 0.5 millimeters and at most 2.0 millimeters.

26. The encoder configuration of claim 1, wherein YDETABS1 is at most 1.0 millimeter.

27. The encoder configuration of claim 1, comprising:
a second absolute track pattern arranged to receive light from the illumination portion and output a respective spatially modulated light pattern along a respective light path; and
a second absolute track detector portion arranged in a fixed relationship relative to the illumination portion, and arranged to receive the respective spatially modulated light pattern from the second absolute track pattern, respectively, wherein:
the second absolute track detector portion comprises individual photodetector areas that have a Y direction edge-to-edge dimension YDETABS2, and
the second absolute track detector portion is configured to spatially filter its received spatially modulated light pattern and output a plurality of respective position indicating signals that have respective spatial phases, wherein:
the second absolute track pattern comprises geometrically congruent subtrack portions that extend along the measuring axis direction, the geometrically congruent subtrack portions configured such that:
the geometrically congruent subtrack portions are separated along the Y direction by a dimension YCENT2, and YCENT2 is less than YDETABS2,
the geometrically congruent subtrack portions each have a Y direction dimension YTOL2, such that the dimensional quantity [YCENT2+2(YTOL2)] is greater than YDETABS2, and
the geometrically congruent subtrack portions are arranged such that if one of the geometrically congruent portions is translated along the Y direction by the dimension YDETABS2, then the geometrically congruent portions will nominally coincide; and
the second absolute track pattern comprises patterned signal varying portions configured such that an area of the patterned signal varying portions varies corresponding to a second periodic function of x having a spatial wavelength L2, where x designates an x-coordinate location along the measuring axis direction, and the second periodic function is not a square wave.

28. The encoder configuration of claim 27, wherein an overall Y direction dimension of the absolute scale pattern is at most 3.0 millimeters.

* * * * *